United States Patent
Tejaswini et al.

(10) Patent No.: US 7,363,379 B2
(45) Date of Patent: Apr. 22, 2008

(54) ACCESS POINT ASSOCIATION HISTORY IN WIRELESS NETWORKS

(75) Inventors: Fnu Tejaswini, San Diego, CA (US); Shahrnaz Azizi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 971 days.

(21) Appl. No.: 10/675,881

(22) Filed: Sep. 30, 2003

(65) Prior Publication Data

US 2005/0071476 A1    Mar. 31, 2005

(51) Int. Cl.
*G06F 15/16* (2006.01)
(52) U.S. Cl. .................. 709/227; 709/224; 455/435.2; 455/525
(58) Field of Classification Search ................ 709/223, 709/224, 226, 227; 455/435.2, 525
See application file for complete search history.

(56) References Cited

U.S. PATENT DOCUMENTS

| 6,629,151 | B1 * | 9/2003 | Bahl | 709/250 |
| 6,847,654 | B2 * | 1/2005 | Zegelin | 370/463 |
| 2001/0034796 | A1 * | 10/2001 | Zebian | 709/245 |
| 2002/0069284 | A1 * | 6/2002 | Slemmer et al. | 709/227 |
| 2003/0177173 | A1 * | 9/2003 | Belimpasakis et al. | 709/203 |

FOREIGN PATENT DOCUMENTS

WO    WO 01/52084 A1 *    7/2001

* cited by examiner

*Primary Examiner*—Saleh Najjar
*Assistant Examiner*—David Lazaro
(74) *Attorney, Agent, or Firm*—Dana B. Lemoine; Lemoine Patent Sevices, PLLC

(57) ABSTRACT

Historical association data is used when deciding whether to associate with an access point in a wireless network.

20 Claims, 5 Drawing Sheets

ACCESS POINT ASSOCIATION HISTORY IN WIRELESS NETWORKS

FIELD

The present invention relates generally to computer networks, and more specifically to wireless networks.

BACKGROUND

Wireless networks typically include mobile stations and access points. A mobile station may "associate" with an access point (referred to herein as the "current access point") to communicate with other devices on the network. Mobile stations may move about while access points are typically stationary. If a mobile station moves around in an area covered by multiple access points, the mobile station may "disassociate" from the current access point and associate with another. The process of disassociation and association may be repeated any number of times, as the mobile station moves about.

In order to decide whether or not to disassociate from the current access point, a mobile station may periodically communicate with a variety of access points, including access points other than the current access point.

DESCRIPTION OF EMBODIMENTS

Figure 1:
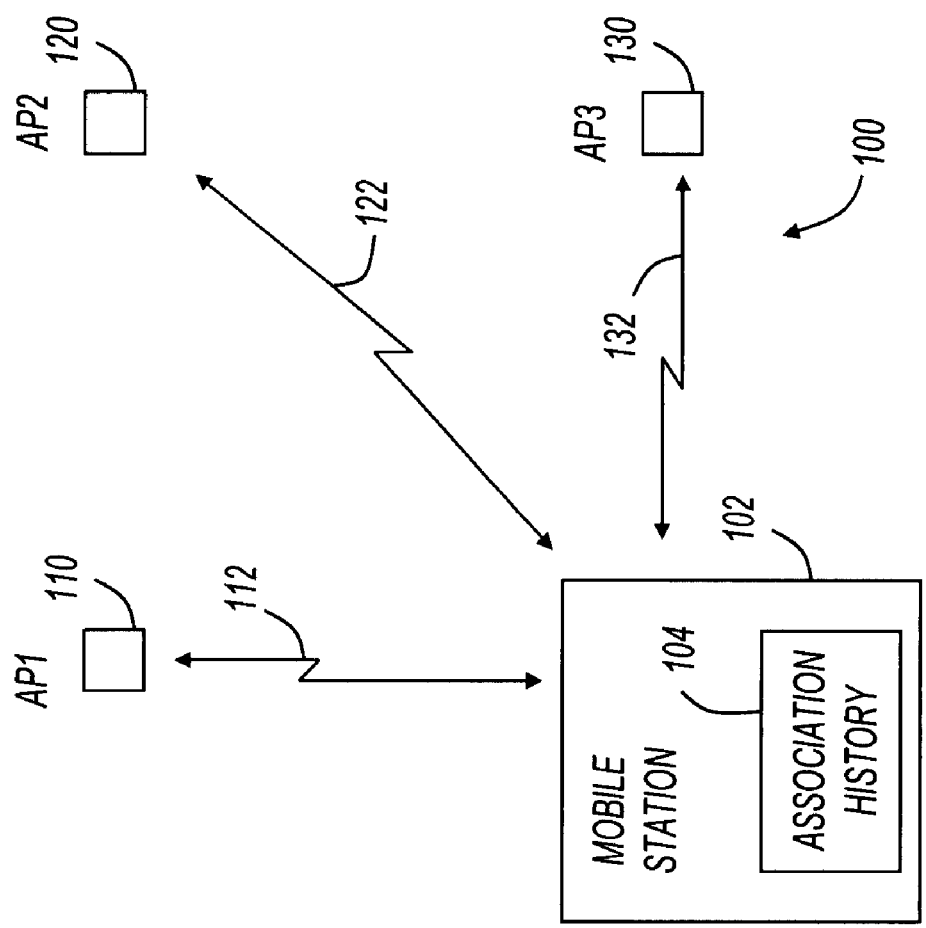
FIG. 1 shows a diagram of a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a wireless network. Wireless network 100 includes mobile station 102 and access points (AP) 110, 120, and 130. In some embodiments, wireless network 100 is a wireless local area network (WLAN). For example, access points 110, 120, and 130, and mobile station 102 may operate in compliance with a wireless network standard such as ANSI/IEEE Std. 802.11, 1999 Edition, although this is not a limitation of the present invention.

Mobile station 102 is shown communicating with access point 110 using signal 112, access point 120 using signal 122, and access point 130 using signal 132. Mobile station 102 may associate with one of the access points for data communications, and may also communicate with other access points to decide if it should end the current association and associate with another access point. For example, mobile station 102 may be associated with access point 110. When a current association exists between mobile station 102 and access point 110, signal 112 allows data to be communicated between mobile station 102 and access point 110.

Mobile station 102 may periodically perform actions in support of making a decision whether to end a current association ("disassociate") and make a new association with a different access point. In some instances, mobile station 102 may perform a scan of available access points and decide to disassociate with the current access point and re-associate with a different access point. In other instances, mobile station 102 may perform a scan of available access points, and not disassociate with the current access point. This may occur when the mobile station performs a scan of available access points and, based on various criteria, decides to maintain the current association rather than disassociate with the current access point.

Mobile station 102 may disassociate and associate many times based on various criteria, including link quality. The link quality may drop if the mobile station moves far away from an access point. The link quality may also drop due to changes in the environment. For example, a number of mobile stations (not shown) may gather near to access point 110 while mobile station 102 is associated with access point 110. This may occur due to a meeting starting in a nearby conference room or a number of people arriving at work and turning on their laptop computers (mobile stations). If the mobile stations associate with access point 110, mobile station 102 may experience a drop in link quality even though it has not moved. Also for example, a door may be closed, or obstacles (such as moving boxes) may be placed in the path between access point 110 and mobile station 102. These items may introduce multipath and may change link quality. If the link quality goes below a "good threshold", then mobile station 102 may decide to disassociate with access point 110, and select a different access point for association.

Mobile station 102 includes association history 104. Association history 104 may be a table of data that includes information regarding past associations between mobile station 102 and various access points. For example, association history 104 may include data describing previous associations with access points 110, 120, and 130. In some embodiments, association history includes data such as: a duration of a last association; a reason for disassociation; average data throughput for a previous association; and number of previous associations.

Association history 104 may include any type or amount of data relating to previous associations to access points without departing from the scope of the present invention. For example, association history 104 may include data readily available from the access point such as: data rates supported by the access point; security capabilities of the access point; the basic service set identity (BSSID); or other capabilities of the access point. Association history 104 may also include data that is calculated by mobile station 102. For example, association history 104 may include averages or other statistical descriptions of previous associations.

In some embodiments, association history 104 may also be used in conjunction with data collected about other access points in the vicinity. In these embodiments, mobile station 102 may not have any data from previous associations with the other access points, but instead may collect the data contained in management frames broadcasted by the access points or mobile station 102 may request data from the access points during scans. The data collected may include performance or channel information, or any other information broadcast from access points.

In operation, mobile station 102 may gather or compute the association history during scanning operations and during previous associations with the various access points. In some embodiments, mobile station 102 may utilize the association history when determining whether or not to disassociate with a current access point and associate with a different access point. In other embodiments, mobile station 102 may not be associated with any access points, and the association history may be used when determining which access point to associate with. Association history 104 may be maintained using many different possible mechanisms. For example, a memory within mobile station may include a data structure that holds the association history.

Figure 2:
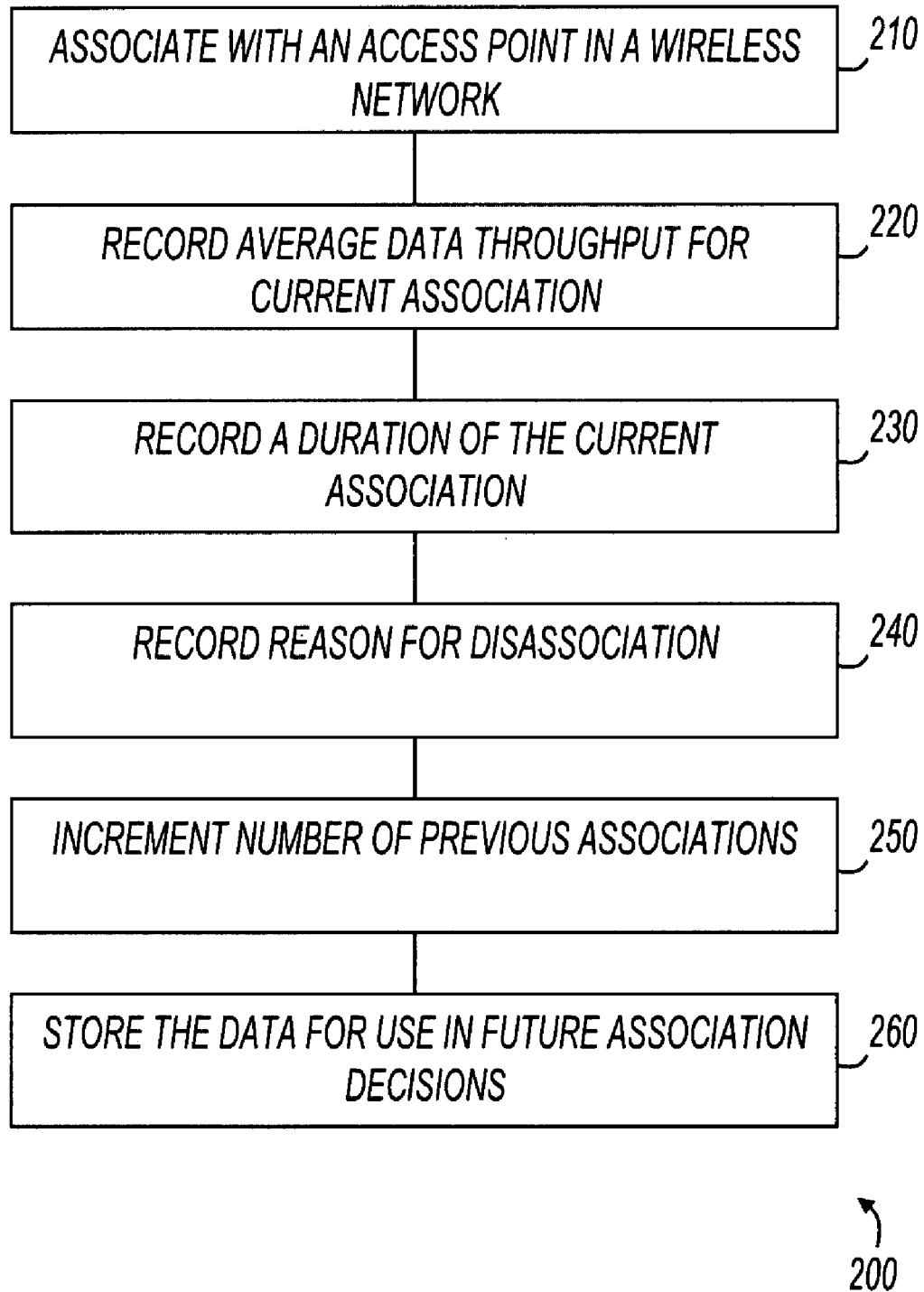
FIGS. 2 and 3 show flowcharts in accordance with various embodiments of the present invention.

FIG. 2 shows a flowchart in accordance with various embodiments of the present invention. In some embodiments, method 200 may be used to gather or compute association history, such as association history 104 (FIG. 1). In some embodiments, method 200, or portions thereof, is performed by a wireless network interface, a processor, or an electronic system, embodiments of which are shown in the various figures. Method 200 is not limited by the particular type of apparatus, software element, or person performing the method. The various actions in method 200 may be performed in the order presented, or may be performed in a different order. Further, in some embodiments, some actions listed in FIG. 2 are omitted from method 200.

Method 200 is shown beginning at block 210 in which a mobile station associates with an access point in a wireless network. Actions described in block 210 may correspond to a mobile station such as mobile station 102 associating with an access point such as access point 110 (FIG. 1).

At 220, an average data throughput for the current association is recorded. At 230, a duration of the current association is recorded, and at 240, a reason for disassociation is recorded. At 250, a number of previous associations is incremented, and at 260, the recorded data is stored for use in future association decisions. The data may be stored in an association history such as association history 104 (FIG. 1) for use by a mobile station such as mobile station 102.

Method 200 describes collecting a few types of data during one association with an access point. In some embodiments, many more types of data relating to the current association are collected in method 200. Also in some embodiments, method 200 is performed each time an association is made, and the association history includes data describing multiple associations for each access point. For example, as a result of performing method 200 multiple times, association history 104 (FIG. 1) may include data describing multiple previous associations with access point 120. Further, the association history may include information describing the time of the association, or the "age" of the data describing the association.

Figure 3:
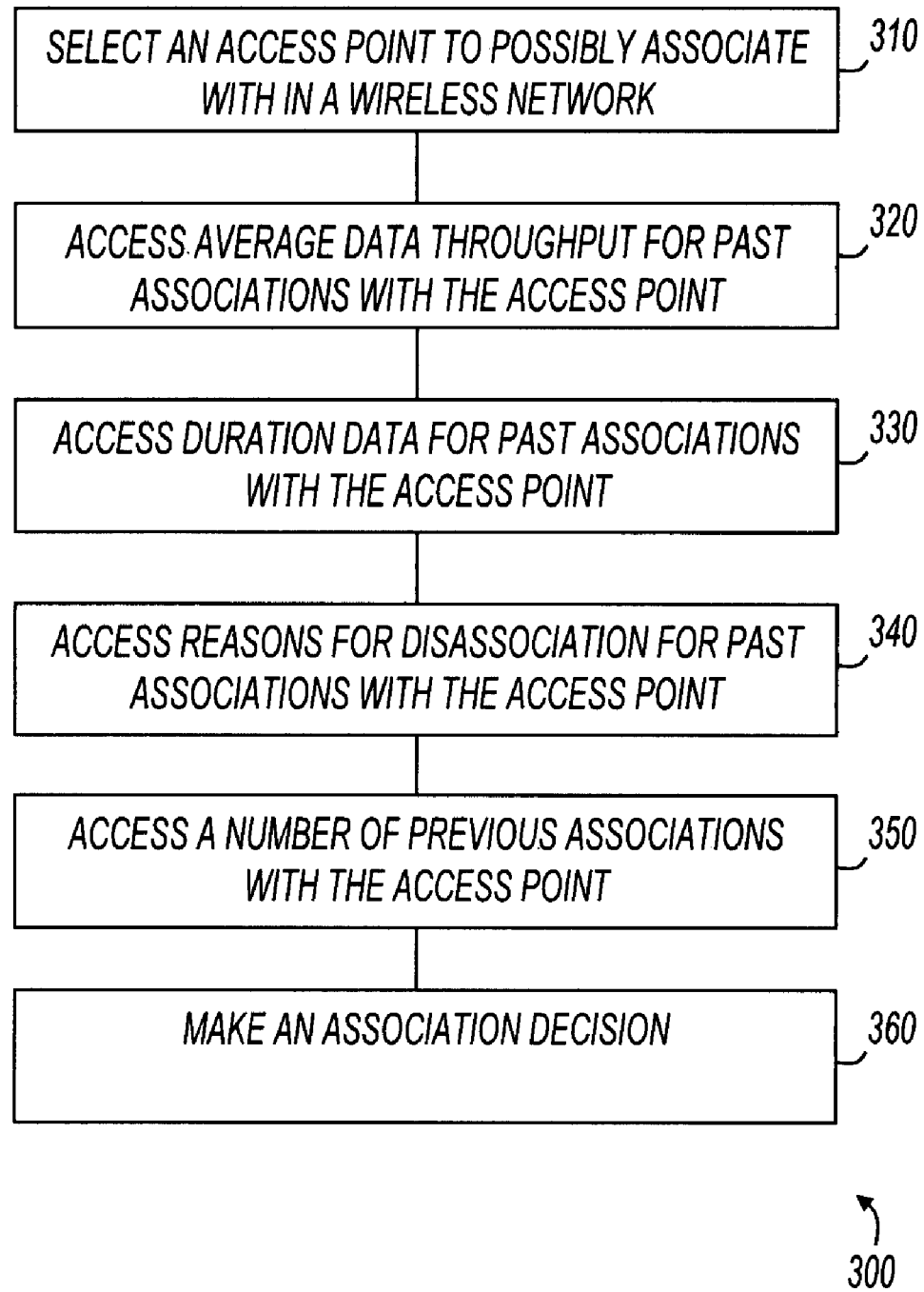

FIG. 3 shows a flowchart in accordance with various embodiments of the present invention. In some embodiments, method 300 may be used to determine whether to associate with an access point in a wireless network. In other embodiments, method 300 may be used to determine whether to disassociate from a current access point and re-associate with a different access point. In some embodiments, method 300, or portions thereof, is performed by a wireless network interface, a processor, or an electronic system, embodiments of which are shown in the various figures. Method 300 is not limited by the particular type of apparatus, software element, or person performing the method. The various actions in method 300 may be performed in the order presented, or may be performed in a different order. Further, in some embodiments, some actions listed in FIG. 3 are omitted from method 300.

Method 300 is shown beginning at block 310 in which a mobile station selects an access point to possibly associate with in a wireless network. For example, referring now back to FIG. 1, mobile station 102 may have a current association with access point 110. Mobile station 102 may select access point 120 as a candidate for a possible future association. The remainder of method 300 is described using this example, where mobile station 102 is currently associated with access point 110, and is considering ending the current association and associating with access point 120.

At 320, mobile station 102 accesses an average data throughput for past associations with access point 120, and at 330, mobile station 102 accesses duration data for past associations with access point 120. At 340, mobile station 102 accesses reasons for disassociation for past associations with access point 120, and at 350, mobile station 102 accesses a number of previous associations with access point 120.

At 360, an association decision is made based, at least in part, on the data accessed in method 300. For example, if the average data throughput for the most recent association with access point 120 is very high, mobile station 102 may decide to disassociate with access point 110 and associate with access point 120. Also for example, if the duration of the most recent association with access point 120 is short, then mobile station 102 may decide not to associate with access point 120.

Any amount of association history data may be utilized in the decision whether or not to associate with an access point. For example, in the previous paragraph, embodiments are described that utilize a single type of data (data throughput and duration of association). In some embodiments, multiple types of association data are combined when making the decision in block 360. For example, if an average data throughput for a previous association is high, but the duration of that association is short, the mobile station may decide not to associate with the access point. Also for example, if the average duration for a previous association is moderate, but the duration of the last association is long, the mobile station may decide to associate with the access point. Also for example, if a previous association was short, and the disassociation was caused by the access point, the mobile station may decide not to associate with the access point. On the other hand, if a previous association was short, but the disassociation was caused by the mobile station, the mobile station may decide to associate with the access point or may decide to consider other data in support of the association decision. Also for example, if there is a new access point in the vicinity that is "similar" to the current access point or a previous access point, the mobile station may decide to associate with the new access point. Access points may be considered "similar" based on supported features, signal quality, or the like.

In some embodiments, the association history for multiple access points is accessed and compared. For example, blocks 310, 320, 330, 340, and 350 may be performed for each access point that is available, and the "best" access point may be chosen based on a comparison between the association history of the various access points. For example, association history 104 may include a "ranking" of access point based on average data throughput, duration of previous associations, number of previous associations, or other criteria. Association history 104 may also include stored metric values that are a result of combining the various criteria. In some of these embodiments, method 300 may include accessing the metrics corresponding to various access point, comparing the metrics, and picking the "best" access point.

Figure 4:
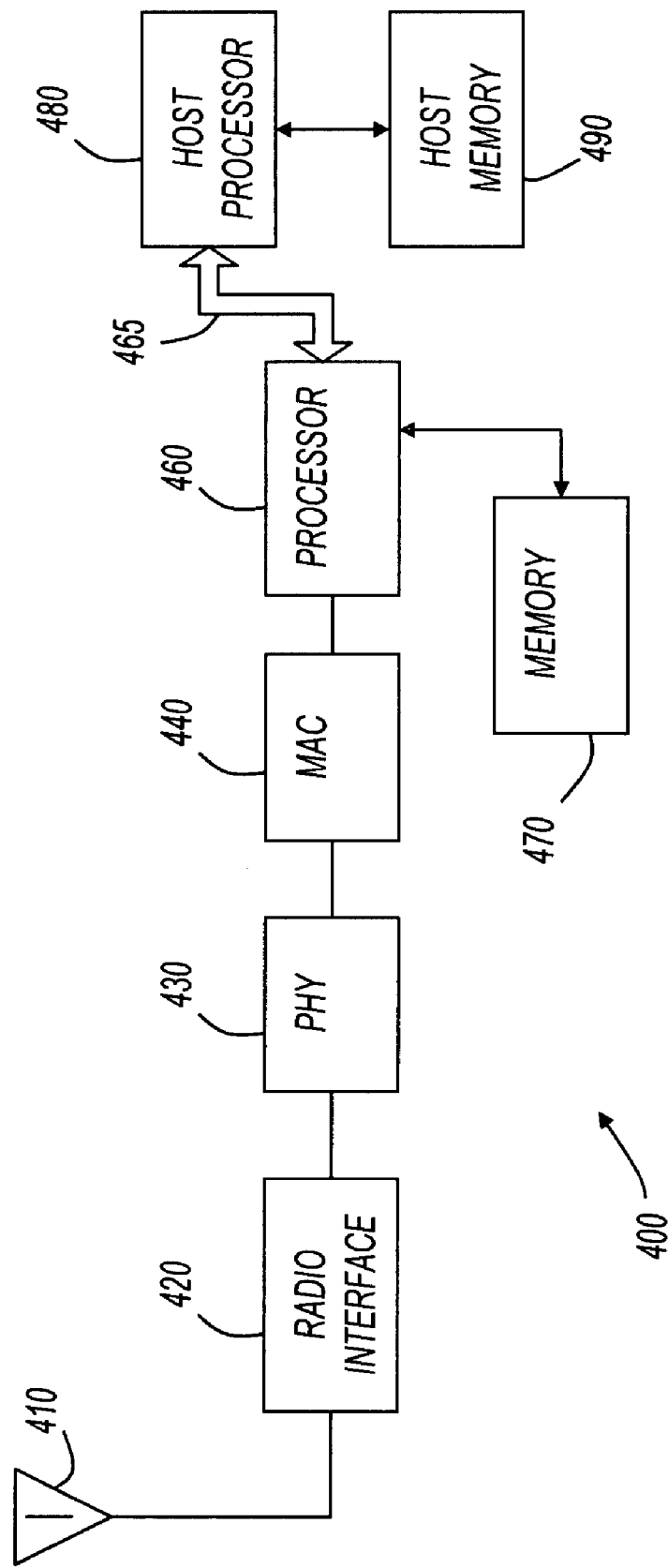
FIG. 4 shows a system diagram in accordance with various embodiments of the present invention.

FIG. 4 shows a system diagram in accordance with various embodiments of the present invention. Electronic system 400 includes antenna 410, radio interface 420, physical layer (PHY) 430, media access control layer (MAC) 440, processor 460, and memory 470. Electronic system 400 also includes host processor 480 and host memory 490. In operation, system 400 sends and receives signals using antenna 410, and the signals are processed by the various elements shown in FIG. 4. Antenna 410 may be a directional antenna or an omni-directional antenna. As used herein, the term omni-directional antenna refers to any antenna having a substantially uniform pattern in at least one plane. For example, in some embodiments, antenna 410 may be an omni-directional antenna such as a dipole antenna, or a quarter wave antenna. Also for example, in some embodiments, antenna 410 may be a directional antenna such as a parabolic dish antenna or a Yagi antenna.

Host processor 480 is coupled to processor 460 by bus 465. The blocks shown to the left of bus 465 may be an apparatus such as a wireless network interface, and the blocks shown to the right of bus 465 may be an apparatus or system such as a laptop computer. In some embodiment, bus 465 represents a communications bus such as a peripheral component interconnect (PCI) bus, however this is not a limitation of the present invention.

Radio interface 420 is coupled to antenna 410 to interact with a wireless network. Radio interface 420 may include circuitry to support the transmission and reception of radio frequency (RF) signals. For example, in some embodiments, radio interface 420 includes an RF receiver to receive signals and perform "front end" processing such as low noise amplification (LNA), filtering, frequency conversion or the like. Also for example, in some embodiments, radio interface 420 includes circuits to support frequency up-conversion, and an RF transmitter. The invention is not limited by the contents or function of radio interface 420.

Physical layer (PHY) 430 may be any suitable physical layer implementation. For example, PHY 430 may be a circuit block that implements a physical layer that complies with the IEEE 802.11 standard or other standard. Examples include, but are not limited to, direct sequence spread spectrum (DSSS), frequency hopping spread spectrum (FHSS), and orthogonal frequency division multiplexing (OFDM). Media access control layer (MAC) 440 may be any suitable media access control layer implementation. For example, MAC 440 may be implemented in software, or hardware or any combination thereof. In some embodiments, MAC 440 may be implemented in software that is partially executed by processor 460 and partially executed by host processor 480.

Processor 460 may be a processor that collects and uses association history data to support association decisions. For example, processor 460 may perform methods such as method 200 (FIG. 2) or method 300 (FIG. 3). Processor 460 represents any type of processor, including but not limited to, a microprocessor, a digital signal processor, a microcontroller, or the like.

Memory 470 represents an article that includes a machine readable medium. For example, memory 470 represents a random access memory (RAM), dynamic random access memory (DRAM), static random access memory (SRAM), read only memory (ROM), flash memory, or any other type of article that includes a medium readable by processor 460. Memory 470 may store instructions for performing the execution of the various method embodiments of the present invention. Memory 470 may also store association history data.

Host processor 480 may be any processor capable of communication with processor 460 over bus 465. Host processor 480 represents any type of processor, including but not limited to, a microprocessor, a personal computer, a workstation, or the like.

Host memory 490 represents an article that includes a machine readable medium. For example, host memory 490 represents any one or more of the following: a hard disk, a floppy disk, random access memory (RAM), dynamic random access memory (DRAM), static random access memory (SRAM), read only memory (ROM), flash memory, CDROM, or any other type of article that includes a medium readable by host processor 480. Host memory 490 may store instructions for performing the execution of the various method embodiments of the present invention. Host memory 490 may also store association history data.

Systems represented by the various foregoing figures can be of any type. Examples of represented systems include computers (e.g., desktops, laptops, handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Processors, wireless network interfaces, and other embodiments of the present invention can be implemented in many ways. In some embodiments, they are implemented in electronics as part of mobile stations for use in wireless networks. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process.

Figure 5:
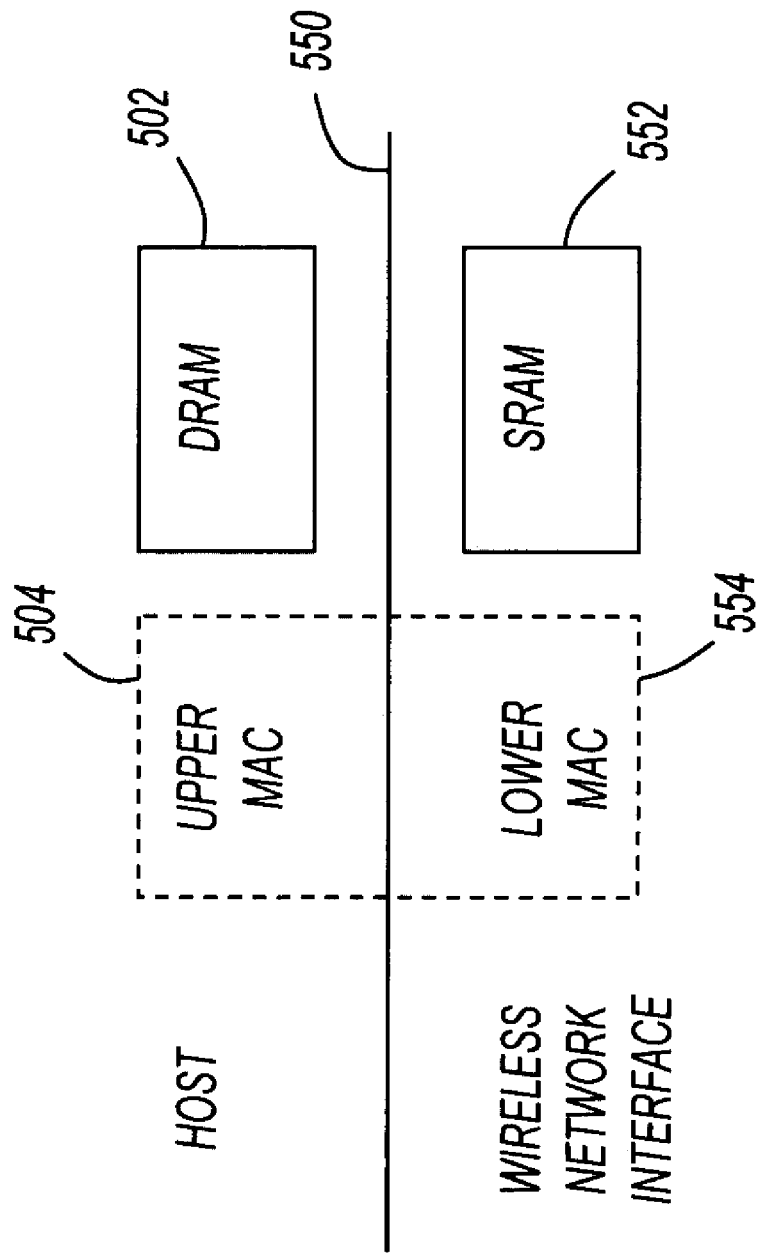
FIG. 5 shows a diagram of an interface between a host and a wireless network interface.

FIG. 5 shows a diagram of an interface between a host and a wireless network interface. Shown in FIG. 5 are dynamic random access memory (DRAM) 502 and static random access memory (SRAM) 552 on either side of dividing line 550. Dividing line 550 is meant to symbolize the division of an electronic system into a host (above dividing line 550), and a wireless network interface (below dividing line 550). DRAM 502 and SRAM 552 are memory devices. Other memory devices may be substituted for DRAM 502 and SRAM 552 without departing from the scope of the present invention. For example, FLASH memory or any other type of memory may be utilized for either or both of DRAM 502 and SRAM 552.

FIG. 5 also shows upper MAC 504 above dividing line 550, and lower MAC 554 below dividing line 550. This shows that the media access control layer (MAC) may be divided between the host system and the network interface. For example, in some embodiments, the host represented in FIG. 5 may be a laptop computer, and the wireless network interface represented in FIG. 5 may be a card that plugs into the laptop computer. Also for example, in some embodiments, DRAM 502 may correspond to host memory 490 (FIG. 4), and SRAM 552 may correspond to memory 470 (FIG. 4).

In some embodiments, lower MAC 554 may be implemented in embedded software or firmware in SRAM 552. In other embodiments, the wireless network interface includes other storage elements to store embedded software or firmware, such as FLASH memory. In these embodiments, SRAM 552 may be used for data storage. In some embodiments, upper MAC 504 is implemented as part of a device driver running on the host system.

Association history data may be stored in SRAM 552, DRAM 502, or a combination of the two. For example, in some embodiments, lower MAC 554 collects association history data and passes that data to upper MAC 504 to allow the host system to store the association history data using host system resources. Also for example, in some embodiments, when deciding whether to make a new association, lower MAC 554 may request association data from upper MAC 554. Further, upper MAC 504 may access the association history data, make a decision, and pass the decision to lower MAC 554. The division of responsibilities between upper MAC 504 and lower MAC 554 is not a limitation of the present invention.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   collecting data in a lower media access control (MAC) layer implemented in a wireless network interface, the data regarding a current association in a wireless network;
   passing the data to an upper media access control (MAC) layer implemented in a host system coupled to the wireless network interface;
   storing the data as association history data in the host system for use in future association decisions;
   passing the association history data back to the lower media access control layer implemented in the wireless network interface in response to a request from the lower media access control layer for the association history data; and
   performing an association decision at the lower media access control layer based at least in part on the association history data.

2. The method of claim 1 wherein the data includes data throughput of the current association.

3. The method of claim 1 wherein the data includes a duration of the current association.

4. The method of claim 1 wherein the data includes a reason for disassociation of the current association.

5. The method of claim 1 wherein the data includes a number of previous associations.

6. The method of claim 1 wherein the method is performed at least in part by software embedded on a memory of a host system.

7. A method comprising:
   collecting data in a lower media access control (MAC) layer implemented in a wireless network interface, the data regarding a current association in a wireless network;
   passing the data to an upper media access control (MAC) layer implemented in a host system coupled to the wireless network interface;
   storing the data as association history data in the host system for use in future association decisions;
   accessing by the upper media access control layer the association history data for at least one access point in a wireless network;
   selecting an access point at the upper media access control layer based at least in part on the association history data; and
   passing information regarding the access point selected to the lower media access control layer implemented in the wireless network interface.

8. The method of claim 7 wherein accessing the association history data comprises accessing a duration of a last association.

9. The method of claim 7 wherein accessing the association history data comprises accessing a reason for disassociation.

10. The method of claim 7 wherein accessing the association history data comprises accessing an average throughput for past associations.

11. The method of claim 7 wherein accessing the association history data comprises accessing a number of previous associations.

12. The method of claim 7 wherein the method is performed at least in part by software embedded on a memory in a wireless network interface.

13. The method of claim 7 wherein the method is performed at least in part by software embedded on a memory in a host system.

14. A method comprising:
   collecting historical association data at a lower media access control layer in a wireless network interface;
   passing the historical association data to an upper media access control layer running in a software driver on a host system, and saving the data using resources of the host system;
   accessing the historical association data through the upper media access control layer in response to a request for association data from the lower media access control layer; and
   passing the historical association data to the lower media access control layer in the wireless network interface to facilitate an association decision.

15. The method of claim 14 wherein accessing association history data comprises accessing a duration of a last association.

16. The method of claim 14 wherein accessing association history data comprises accessing a reason for disassociation.

17. The method of claim 14 wherein accessing association history data comprises accessing an average throughput for past associations.

18. An apparatus including a medium adapted to hold machine-accessible instructions that when accessed result in a machine performing:

collecting data in a lower media access control (MAC) layer implemented in a wireless network interface, the data regarding a current association in a wireless network;

passing the data to an upper media access control (MAC) layer implemented in a host system coupled to the wireless network interface;

storing the data as association history data in the host system for use in future association decisions;

accessing by the upper media access control layer the association history data for at least one access point in a wireless network;

selecting an access point at the upper media access control layer based at least in part on the association history data; and passing information regarding the access point selected to the lower media access control layer implemented in the wireless network interface.

19. The apparatus of claim 18 wherein accessing association history data comprises accessing a duration of a last association.

20. The apparatus of claim 18 wherein accessing association history data comprises accessing an average throughput for past associations.

* * * * *